June 17, 1941.   W. P. MUIR ET AL   2,246,379
VALVE CONTROL MECHANISM FOR HYDRAULIC PRESSES
Filed Nov. 18, 1938   5 Sheets-Sheet 1

INVENTORS
W. P. MUIR
J. H. MAUDE
BY J. D. O'Connell
ATTORNEY

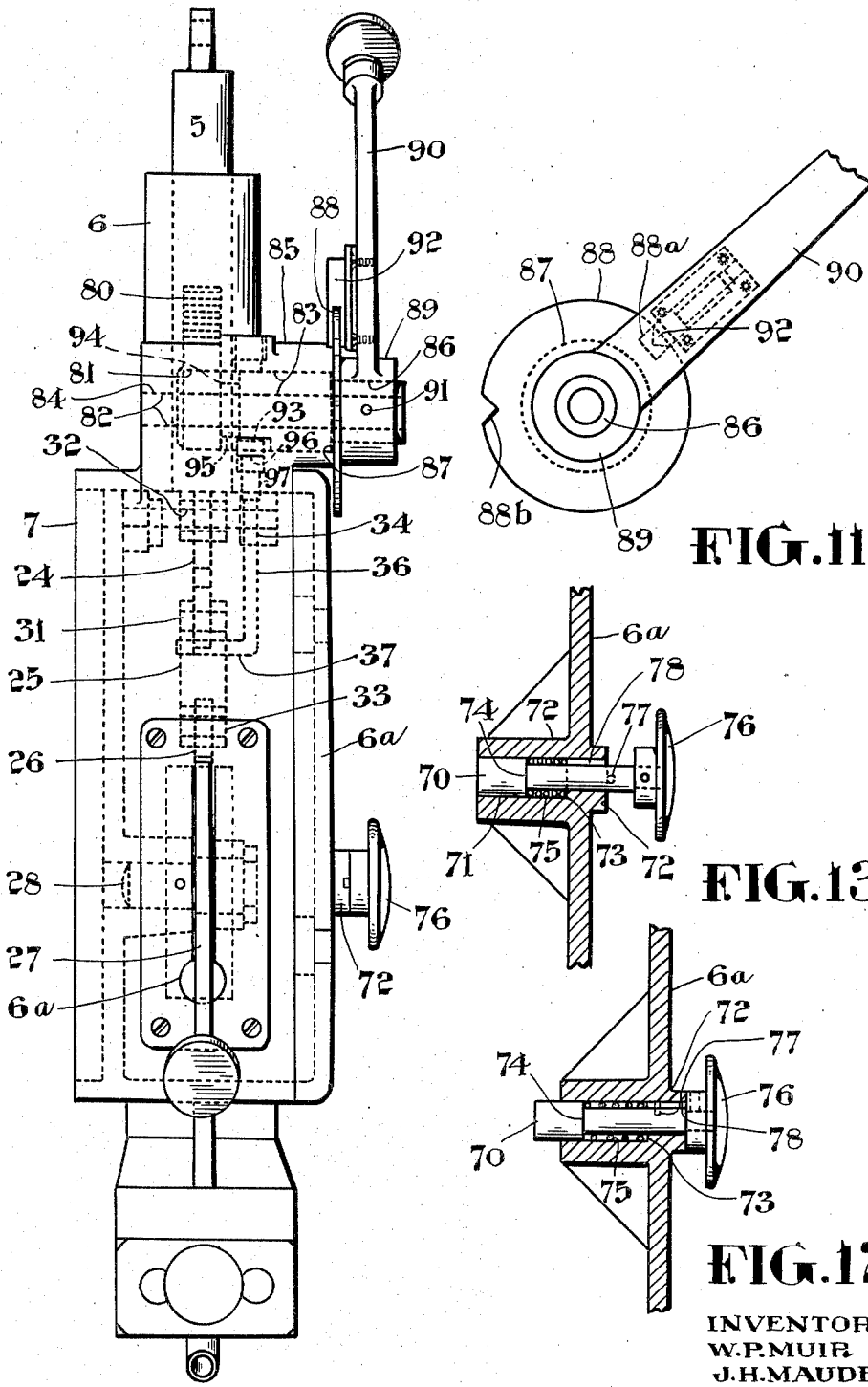

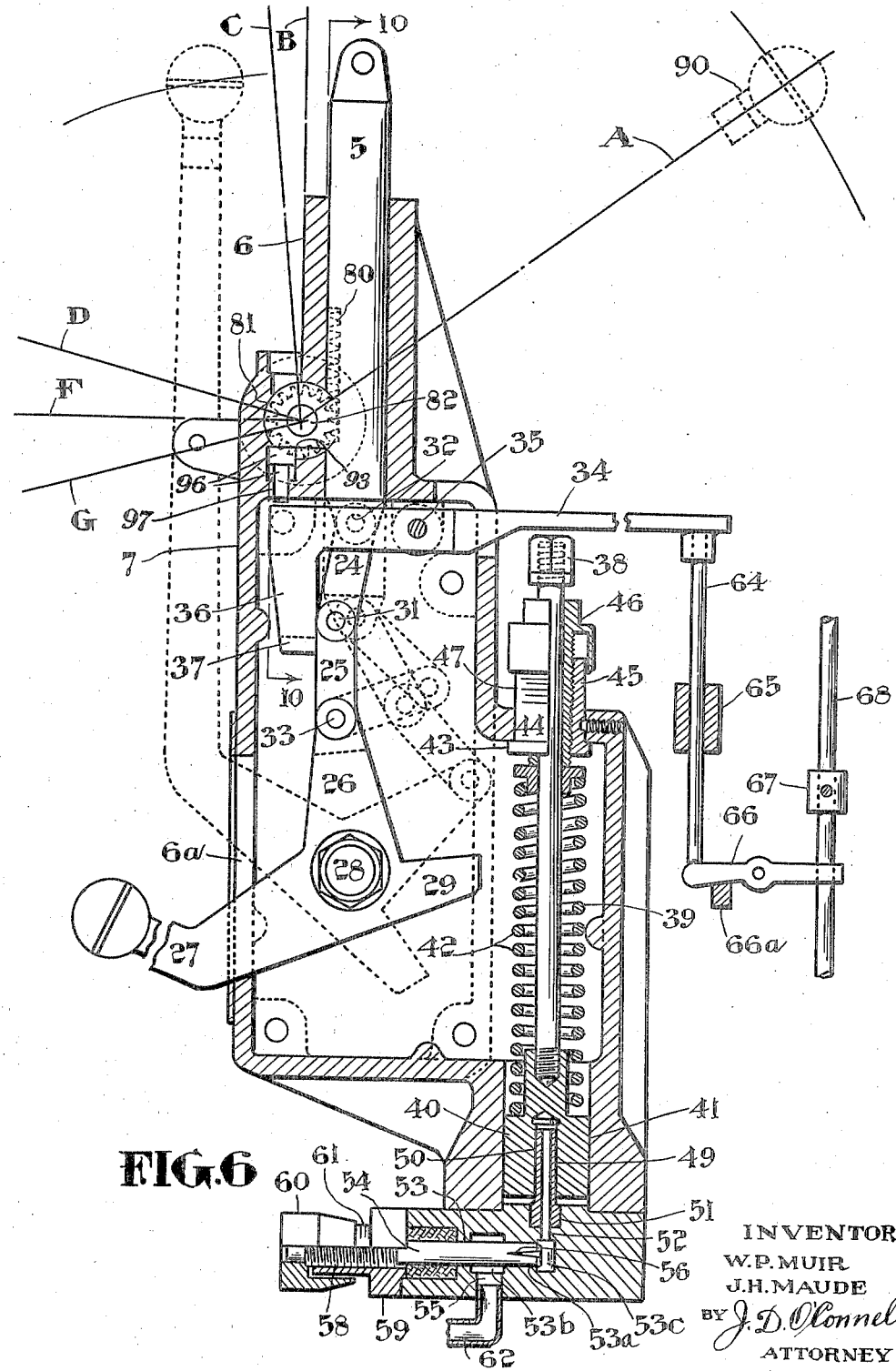

June 17, 1941.  W. P. MUIR ET AL  2,246,379
VALVE CONTROL MECHANISM FOR HYDRAULIC PRESSES
Filed Nov. 18, 1938   5 Sheets-Sheet 4

INVENTORS
W. P. MUIR
J. H. MAUDE
BY J. D. O'Connell
ATTORNEY

Patented June 17, 1941

2,246,379

UNITED STATES PATENT OFFICE 2,246,379

VALVE CONTROL MECHANISM FOR HYDRAULIC PRESSES

William P. Muir, Montreal, Quebec, and John H. Maude, Verdun, Quebec, Canada, assignors to Dominion Engineering Works Limited, Lachine, Quebec, Canada Application November 18, 1938, Serial No. 241,190 In Canada October 20, 1938

16 Claims. (Cl. 121—38)

This invention relates to valve actuating mechanism for controlling the working valve of a hydraulic press such, for example, as the press disclosed in the co-pending application of John H. Maude, filed May 13, 1938, under Serial No. 207,733.

According to one feature of the invention the working valve is shifted to its power and return stroke positions through the agency of a collapsible toggle connected to the valve stem, said toggle being extended to shift the valve to its working stroke position and being collapsed to effect reversal of the valve to its return stroke position.

Another feature of the invention resides in the provision of trip means whereby the toggle is automatically collapsed to reverse the working valve when a predetermined pressure is established in the main press cylinder during the working stroke of the main press ram.

A further feature of the invention resides in the provision of trip means whereby the toggle is automatically collapsed to effect a return stroke of the working valve when the main press ram reaches a predetermined position on its power stroke.

Another feature of the invention resides in the provision of means for timing the collapse of the toggle in response to establishment of a definite predetermined pressure in the main pressing cylinder, said timing means being adjustable to provide "dwell" periods of varying length during which the work is pressed under full press tonnage.

A still further feature of the invention resides in the provision of a manually operable inching control mechanism through the agency of which the working valve may be operated independently of the toggle to effect slow or inching travel of the main press ram in either a power or return stroke direction.

Other features, advantages and novel characteristics of the invention will be more readily understood from the following detailed description taken in connection with the accompanying drawings, in which—

Fig. 5 is an enlarged front elevation of the valve actuating mechanism per se.

Fig. 6 is a vertical sectional view of the assembly appearing in Fig. 5.

Fig. 11 is a detail view showing the mounting of the inching control lever which is actuated to effect the aforesaid slow or inching travel of the pressing ram.

Figs. 12 and 13 are detail views illustrating the mounting of the displaceable stop which is interposed in the path of the main operating lever in the particular manner illustrated in Fig. 4.

Figure 1:
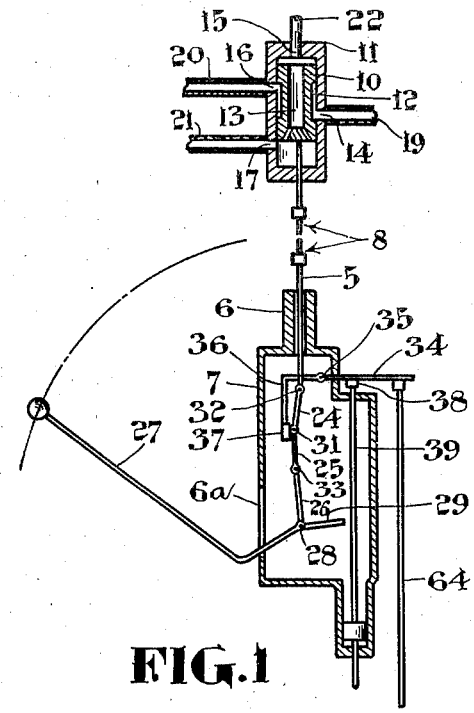
Fig. 1 is a diagrammatic representation of the invention with the parts in the position which they occupy when the valve actuating toggle is extended to effect a working stroke of the press.

Referring more particularly to the drawings, 5 designates a valve operating plunger working in a long guide 6 at the top of a control box 7. The upper end of the plunger is connected, by suitable coupling means 8 (Fig. 1), to the stem 9 of a valve 10 working in a main valve casing 11. In the present instance valve 10 represents and functions in substantially the same manner as the main control valve of the hydraulic press disclosed in the said co-pending application of John H. Maude, filed May 13, 1938, under Serial No. 207,733. Consequently, the following reference to the manner in which said valve is utilized to control flow of fluid to and from the pressing and push back cylinders is deemed sufficient for present purposes.

As here shown valve 10 is provided with an annular port 12 and a full length axial port 13. These ports cooperate with the valve casing ports 14, 15, 16 and 17 in the following manner.

When valve 10 is in the position shown in Figure 1 pressure fluid is pumped to the main pressing cylinder A of the hydraulic press B through supply line 19, ports 14, 12 and 16, and line 20. At the same time fluid, previously supplied to the push back cylinders C of the press, is exhausted from said cylinder through line 21, ports 17, 13 and 15, and main exhaust line 22. In this position of valve 10 a working stroke of the press ram D is effected by the pressure fluid supplied to the main pressing cylinder.

Figure 2:
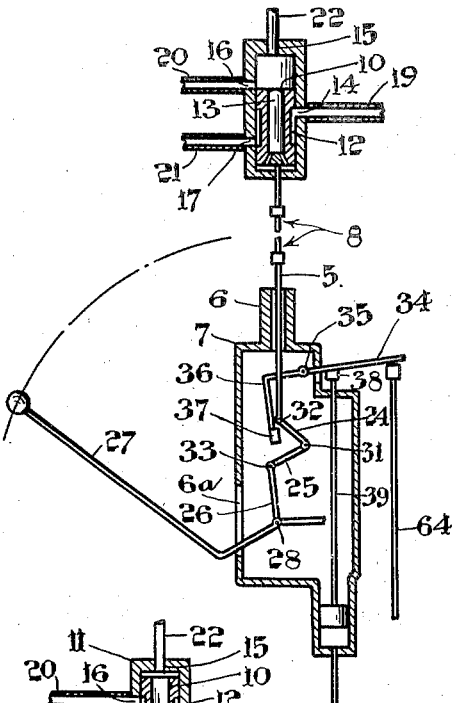
Fig. 2 is a view similar to Fig. 1 but showing the component parts in the position which they occupy when the toggle is collapsed to effect a return stroke of the press.

When valve 10 is in the position shown in Figure 2, fluid pressure is pumped to the push back cylinder C of the hydraulic press through the supply line 19, ports 14, 12 and 17, and line 21. At the same time fluid, previously supplied to the main pressing cylinder, is exhausted therefrom through line 20, upper part of valve casing 11, and line 22. In this position of valve 10 a return stroke of the press ram is effected by the pressure fluid supplied to the push back cylinders.

Figure 7:
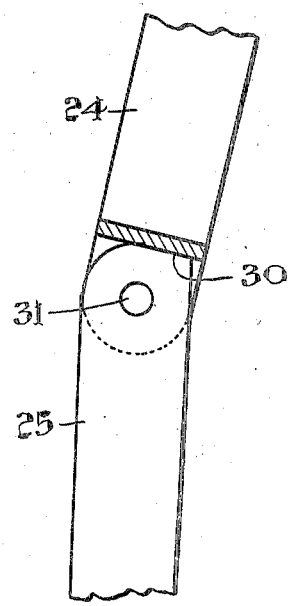
Fig. 7 is a detail view showing the assembly of component links of the valve actuating toggle.
Figure 10:
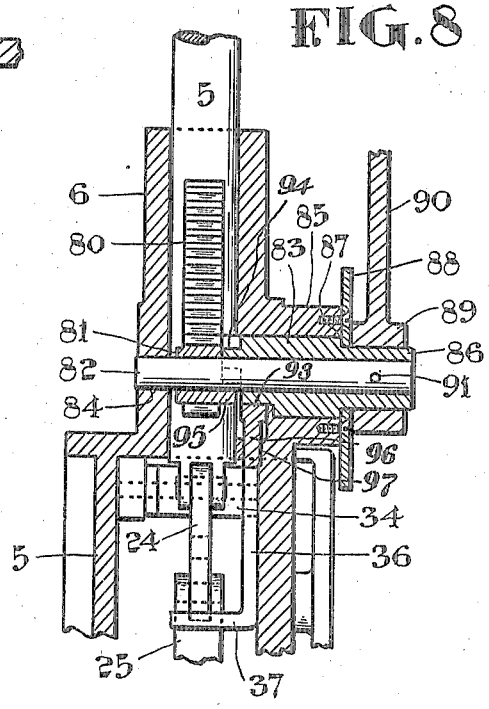
Fig. 10 is a sectional view taken substantially along the line 10—10 in Fig. 6.
Figure 14:
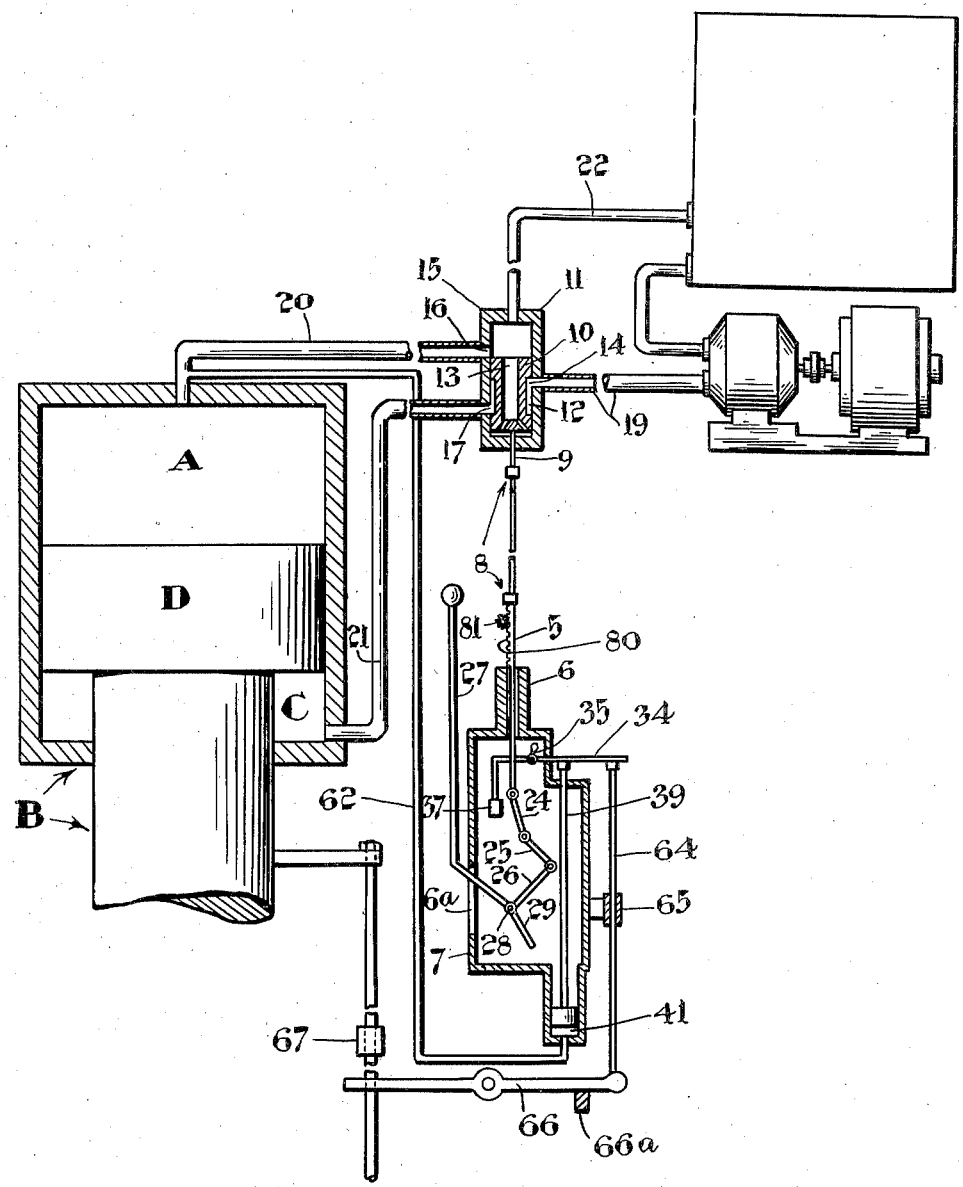
Fig. 14 is a diagrammatic view showing one method of incorporating the invention in the hydraulic circuit of a conventional press.

The lower end of plunger 5 is connected, by toggle links 24 and 25, to a toggle arm 26 formed integral with the main operating lever 27. This lever is loosely mounted on a pivot shaft 28 contained in the lower portion of box 7 and is provided with a second arm 29 lying substantially at right angles to the toggle arm 26. As shown more particularly in Figure 7, link 25 is provided with a shaped stop 30 which engages with link 24 to prevent further clockwise rotation of the latter about the connecting pin 31 when said links are disposed in the positions shown in Fig. 1.

When the press is idling ready for a power stroke the valve 10, plunger 5, toggle links 24 and 25, toggle arm 26, and lever 27 are positioned as shown in Fig. 2. In this position of the parts anti-clockwise movement of toggle arm 26 from the vertical position shown is prevented by engagement of lever 27 with the lower end of the lever slot 6a provided in the control box 7.

Figure 3:
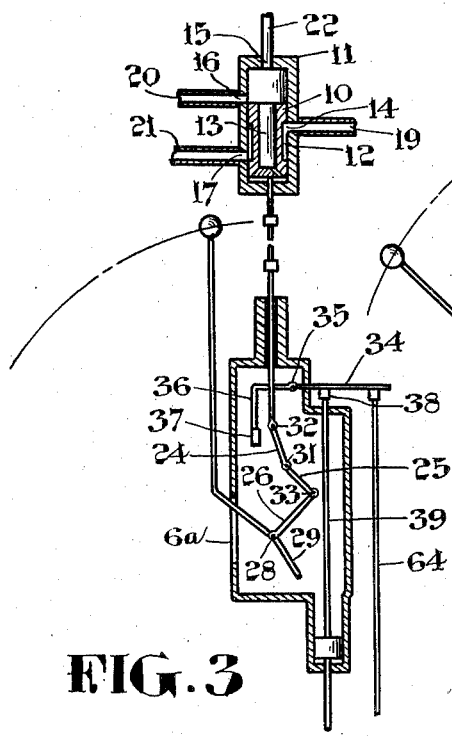
Fig. 3 is a view similar to the preceding figures but showing the component parts in a different position to which said parts are shifted when actuating the control valve from the position shown in Fig. 2 to the position shown in Fig. 1.

To start the press on its power stroke the lever 27 is first raised to shift the toggle arm and the toggle links to the position shown in Fig. 3. With the parts in this new position lever 27 is then swung downwardly to shift the arm 26 and the links 24 and 25 to the position shown in Fig. 1. During this last motion plunger 5 and valve 10 are moved upwardly since the two links 24 and 25 become rigid in the position shown in Fig. 3 by reason of the fact that the shaped stop 30 on link 25 engages link 24 to prevent further clockwise rotation of link 24 with respect to link 25. Consequently, (considering links 24 and 25 as one rigid link in a toggle system having one end pivot at shaft 28 and the other end pivot at the pin 32 connecting plunger 5 with the upper end of link 24) it will be seen that when toggle arm 26 reaches the vertical position shown in Fig. 1 the toggle system will be locked against collapse because the pin connection 33 between link 25 and toggle arm 26 will have passed beyond the centre line between shaft 28 and pin 32, it being remembered that lever 27 is held against further anti-clockwise movement by the lower end of the lever slot 6a and that stop 30 is holding link 24 against further clockwise movement relative to link 25.

A trip lever 34 is loosely mounted on a pivot shaft 35 contained in the upper portion of box 7. An arm 36 depending from the inner end of this lever terminates in a horizontal projection 37 which bears against link 25 when the latter is positioned as shown in Fig. 1. The outer portion of lever 34 overlies a tappet 38 adjustably secured to the upper end of a tappet rod 39 carried by a plunger 40. This plunger works in a cylinder 41 formed in the bottom wall of box 7 and is held down by the lower end of a spring 42 encircling the rod 39. The upper end of spring 42 bears against a spring seat member 43 which is thus held to the lower end of the tappet rod guide sleeve 44. In addition to serving as a guide for rod 39 said sleeve 44 constitutes part of a micrometer screw adjusting device through the agency of which the tension of spring 42 may be closely regulated. In this connection it will be noted that sleeve 44 is threaded through a bushing 45 carried by the box 7 and may be screwed up and down in said bushing to regulate the tension of spring 42. The upper end of sleeve 44 carries a cap 46 which slides on the upper portion of bushing 45 so that the position of the lower edge of the cap in relation to vertically spaced graduation markings 47 (Fig. 6) indicates the tension of the spring for any adjustment of said sleeve.

A hollow stationary plunger 49 is slidably fitted in a bore 50 provided in the movable plunger 40, said bore extending upwardly from the lower end of plunger 40 and being closed at its upper extremity. The lower end of plunger 49 is anchored in the enlarged upper end 51 of a vertical bore 52 extending upwardly from the inner end of a horizontal valve bore 53, the restricted portion of bore 52 being in line with the central bore of plunger 49 and being of substantially the same diameter. A timing valve 54 is slidably mounted in bore 53 and serves to control the flow of fluid from a fluid inlet 55 to the vertical bore 52. In this connection it will be noted that valve bore 53 is shaped to provide a restricted portion 53a lying between two enlarged portions affording fluid pressure chambers 53b and 53c. The inner end of valve 54 is a close sliding fit in the restricted portion 53a of the valve bore and is provided with a fine tapered groove 56 which gradually deepens and widens in the direction of chamber 53c which is located at the inner end of the valve bore in communication with the lower end of port 52. The groove 56 extends longitudinally of valve 54 and is of substantially the same length as the restricted portion 53a of the valve bore. This groove serves, in certain positions of the valve, as a connecting port through which fluid, supplied to chamber 53b through inlet 55, flows to chamber 53c, and from thence through port 52 and hollow plunger 49 to the pressure face afforded by the upper end wall of the plunger bore 50 formed in plunger 40. The rate of fluid flow between chambers 53b and 53c is determined by the area of that portion of groove 56 which is in communication with chamber 53b and this may be regulated by axial adjustment of valve 54. In the present instance such adjustment is made possible by the screw threaded connection 58 provided between the outer portion of valve 54 and a packing gland 59 secured to the control box 7 at the outer end of the valve bore 53. A cap member 60 is fixed to the outer ends of valve 54 and serves as an operating knob by which the valve is turned to effect the desired adjustment. The cap 60 fits over a tubular portion of the gland 59 so that the position of the inner edge of the cap with reference to suitable graduations 61 on the gland indicates the position of the valve.

When the component links 24 and 25 of the toggle system have been moved to and locked in the position shown in Fig. 1 the press ram will move downwardly on its power stroke. When the ram engages the work the fluid pressure in the pressing cylinder will increase until a predetermined tonnage is reached. This fluid pressure is transmitted through pipe connections 62 (Fig. 6) to the timing valve inlet 55 and bleeds through groove 56 to pressure chamber 53c from whence it passes upwardly through the hollow plunger 49 and acts against the movable trip plunger 40. The intensity of this pressure acting on plunger 40 is resisted by the control spring 42 so that upward movement of plunger 40 does not occur until the fluid pressure acting thereon exceeds the pressure at which spring 42 has been set by the micrometer screw adjusting device associated with the tappet rod 39. When plunger 40 thus moves upwardly it acts, through tappet rod 39 and tappet 38 to swing trip lever 34 in an anti-clockwise direction so that the lever projection 37 presses toggle link 25 to the right thus collapsing the toggle and permitting the valve operating plunger 5 to drop to the valve reversing position shown in Fig. 2. The period elapsed from the instant the press ram makes contact with the work on the power stroke until the toggle is tripped by the trip plunger 40 and trip lever 34 is determined by the rate of fluid flow to the bore 50 of the trip plunger and this is regulated by the setting of the timing valve 54. It is thus possible to have a varying "dwell" under full press tonnage so as to suit different types of pressing operations.

The invention also contemplates the provision of means for operating the toggle collapsing trip lever 34 when the pressing ram reaches any predetermined position of its power stroke. To this end the outer extremity of lever 34 is disposed directly above the upper end of a trip rod 64 sliding in a suitable bearing 65 mounted on a convenient portion of the press. The lower end of rod 64 is disposed above one end of an intermediately pivoted lever 65 which is supported in the horizontal position shown by a suitable supporting element 66a. The remaining end of lever 66 is disposed in the path of travel of an actuating member 67 which is actuated by the pressing ram during the power stroke of the press. As here shown the actuating member 67 is adjustably secured to a bar 68 which travels downwardly with the pressing ram during the power stroke of the press. The position of the actuating member on the bar 68 determines the time of contact between the actuating member and the lever 65.

When the mechanical trip rod 64 is in use the hydraulic trip plunger 40 is put out of action by closing the valve 54, this being accomplished by moving the valve inwardly to disrupt communication between the pressure chamber 53b and the groove 56.

The foregoing description deals with what may be termed the semi-automatic operation of the valve actuating mechanism. In this operation the power stroke of the press is initiated by manual operation of the toggle extending lever 27 while the return stroke is initiated by automatic operation of the toggle collapsing trip lever 34.

Figure 4:
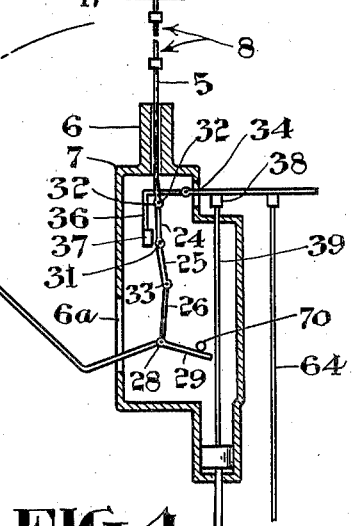
Fig. 4 is a view similar to Fig. 1 but showing the interposition of a stop member in the path of the main operating lever to limit the travel of the lever so that collapse of the toggle occurs as soon as the lever is released after being moved to a toggle extending position.
Figure 9:
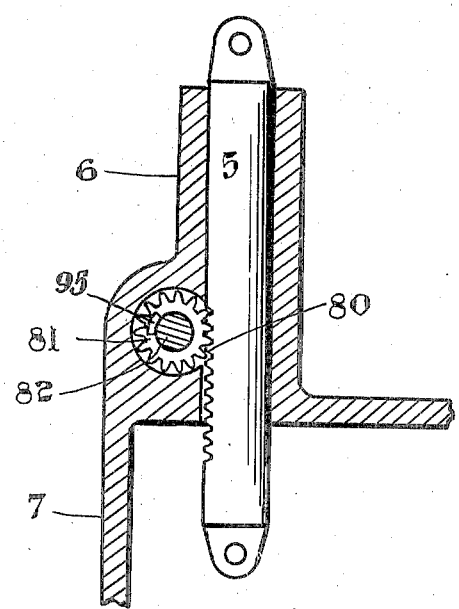
Fig. 9 is a detail sectional view showing part of the mechanism by which the main control valve is actuated to effect a slow or inching movement of the press ram in either direction.
Figure 8:
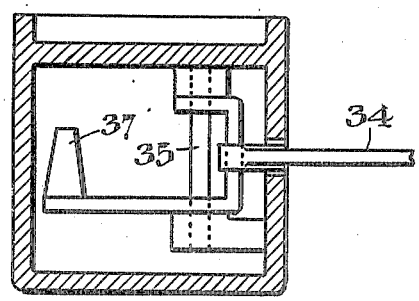
Fig. 8 is a detail sectional view showing the mounting of the toggle trip lever.

The invention also contemplates the provision of means for enabling the operator to control reversal of valve 10 independently of the automatically operated trip lever 34. Referring to Fig. 4, it will be noted that a stop pin 70 has been interposed in the path of travel of the arm 29 which is formed integral with the inner end of the lever 27. In this case the valve 10 is set for a power stroke of the press by shifting the toggle links 24 and 25 and the lever 27 from the position shown in Fig. 2 to the successive positions shown in Figs. 3 and 4. When the lever 27 reaches the position shown in Fig. 4 it is prevented from moving further in an anti-clockwise direction by the engagement obtaining between the stop pin 70 and the arm 29. In this position of the parts the toggle is not locked against collapse since the pin connection 33 between toggle arm 26 and link 25 is located at the right of the centre line between shaft 28 and the pin connection 32 between the plunger 5 and the toggle link 24. Consequently, as soon as the lever 27 is released by the operator the toggle will collapse and permit the valve 10 to drop to the position shown in Fig. 3.

As shown in Figs. 5, 12. and 13, the stop pin 70 is slidably mounted in the bore 71 of a bearing member 72 carried by the control box cover 6a. A portion of the bore 71 is constricted to provide a shoulder 73 opposing a shoulder 74 formed on the pin 70. A spring 75 is confined between these shoulders and normally urges the pin inwardly to the lever obstructing position shown in Fig. 4. The pin 70 is also provided with an operating knob 76 and a projection 77, the latter working in a guide slot 78 formed in the constricted portion of the bore 71. During semi-automatic operation of the press the pin 70 is retracted to and secured in an inoperative position by pulling outwardly on the knob 76 until the projection 77 clears the outer end of the guide slot 78. The knob 76 is then turned through 90° so that the projection 77 bears against the outer end of the bearing member 72 (Fig. 13) and prevents the spring 75 from returning pin 70 to its operative position.

Plunger 5 is provided with rack teeth 80 meshing with a pinion 81 loosely mounted on a shaft 82 contained in the upper portion of control box 7. This shaft carries a sleeve 83 and has one end rotatably mounted in a suitable bearing 84. Sleeve 83 is rotatably mounted in the bore of a hollow hub 85 formed integral with the box 7. Sleeve 83 is formed with a reduced outer portion 86 affording a shoulder 87 which bears against a latch plate 88 secured to the hub 85. The reduced portion of the sleeve lying outside the latch plate is secured to the shaft 82 and to the encircling hub portion 89 of an inching control lever 90 by a fastening pin 91. The lever 90 carries a spring latch 92 adapted to be selectively engaged in notches 88a and 88b formed in the latch plate 88.

Sleeve 83 is provided, at its inner end, with a flat surface 93 and a jaw 94 the latter being adapted for engagement with a similar jaw 95 formed on the pinion 81. The flat surface 93 engages and is adapted to depress the head of a pin 96 which is arranged to slide in a vertical bore 97 and bears on the inner end of the trip lever 37.

Lever 90 serves as an "inching" control lever which is normally secured in position A (Fig. 6) by engaging latch 92 in notch 88a of latch plate 88. In this position of the lever the jaw dog 94 on sleeve 83 and the jaw 95 on pinion 81 are separated so as not to interfere with the previously described operation of the toggle mechanism.

When lever 90 is to be used for inching control purposes it is shifted from position A through positions B, C and D to position F. During movement of the lever from position A to position B the flat surface 93 of sleeve 83 depresses pin 96 which, in turn, acts against lever 34 to shift the lever projection 37 to a position preventing the toggle links from locking in any subsequent motion of the mechanism. Rotation of lever 90 from position B to position C engages the jaw 94 on sleeve 83 with the jaw 95 on pinion 81. Consequently, during further anti-clockwise rotation of lever 90 from position C to position F the engagement obtaining between the jaws 94 and 95 rotates the pinion 81 to raise the plunger 5 so that the working valve 10 is disposed in its neutral or mid position by the time lever 90 reaches its position F. In this latter position of lever 90 the latch 92 is engaged in the notch 88b of latch plate 88. With lever 90 in position F a slow or inching motiton of the press ram in the direction of its power stroke may be obtained by moving the lever downwardly through an angle of 15½° to position G. Likewise a slow or inching movement of the ram on its return stroke may be obtained by moving the lever 90 upwardly through an angle of 15½° from position F to position D.

Having thus described what is now considered to be the preferred embodiment of this invention, it will be understood that various modifications may be resorted to within the scope and spirit of the appended claims. It will also be understood that the invention, while especially adapted for controlling the main working valve of a hydraulic press, as described herein, may also be used in other relations.

Having thus described our invention, what we claim is:

1. Valve actuating mechanism of the character described comprising, in combination, a valve, a rack member connected to said valve, a pinion meshing with said rack member, a shaft on which said pinion is rotatably mounted, means for operating said pinion and rack member in response, to rotation of said shaft comprising a driving element fixed to rotate with said shaft and a driven element on the pinion adapted to be engaged by said driving element, a valve operating lever and toggle links connected between said lever and said rack member.

2. Valve actuating mechanism of the character described comprising a valve, a slidably mounted plunger having one end connected to said valve, a pivoted operating lever, a toggle connected between said lever and the opposite end of said plunger and adapted to be extended to move the plunger in one direction when said lever is swung to a predetermined position, a pinion meshing with rack teeth carried by said plunger, a shaft on which said pinion is rotatably mounted, means for driving said pinion in response to rotation of said shaft, said means comprising a sleeve fixed to rotate with said shaft and provided with a jaw adapted to engage a coacting jaw carried by said pinion, trip means movable into engagement with one of the toggle links for collapsing said toggle while said lever is still in its toggle extending position, and means for operating said trip means to collapse said toggle at a predetermined instant following operation of the lever to its toggle extending position.

3. Valve actuating mechanism comprising, in combination, a valve, a valve operating lever, a self-locking toggle connected between the valve and the lever adapted to be moved to and locked in an extended condition when the lever is moved to the end of its travel in one direction and to retain its extended condition when the lever is released after being operated to its toggle extending position, means independent of said lever for engaging and collapsing said toggle following operation of the lever to its toggle extending position, and means for limiting the travel of the lever in a toggle extending direction when it is desired to prevent the toggle becoming locked in its extended position, said means serving to stop the lever when the toggle has been extended sufficiently to operate the valve but has not yet reached its self-locking position.

4. Valve actuating mechanism comprising, in combination, a valve, a valve operating lever, a toggle connected between the valve and the lever so that the toggle becomes self locked in an extended position when the lever is swung to the full limit of its travel in a toggle extending direction and means adapted to be interposed in the path of movement of said lever to prevent full travel thereof in said toggle extending direction, said means serving to arrest the lever after the toggle has been extended to a valve operating position but before the toggle has reached its self locking position.

5. The combination with the working valve of a hydraulic press, of a manually operable valve operating lever, a valve operating toggle connected between said valve and lever so that said toggle is moved to and becomes locked in an extended position when said lever is swung to the full limit of its travel in a toggle extending direction, means adapted to be interposed in the path of movement of said lever to prevent full travel thereof in said toggle extending direction, said means serving to arrest the lever after the toggle has been extended to a valve operating position but before the toggle has reached its fully extended self-locking position and toggle tripping means including a member adapted to be moved against one of the toggle links to collapse the toggle after the latter has been moved to and locked in its fully extended position by said lever.

6. The combination with the working valve of a hydraulic press of a valve operating toggle connected to said valve, said toggle being adapted to be extended to shift the valve to its power stroke position and to be collapsed to shift the valve to its return stroke position, means for collapsing and extending said toggle and means for operating said valve independently of said toggle to permit shifting of the valve to working positions intermediate the working positions to which the valve is operated by said toggle, said last mentioned means having a lost motion drive connection with said valve so that it does not interfere with extension and collapse of said toggle.

7. In a hydraulic press, a press cylinder, mechanism for controlling the main working valve comprising a collapsible toggle connected to said valve, manually operable means for extending the toggle to shift the valve to a working stroke position, said toggle being self-locking in its fully extended condition, means other than said first mentioned means for engaging and collapsing said toggle to effect shifting of the valve from a working stroke to a return stroke position and means for automatically operating said second mentioned means in response to the establishment of a predetermined pressure in the pressing cylinder during a working stroke of the press.

8. In a hydraulic press, a press cylinder, a ram therein, mechanism for controlling the main working valve comprising a collapsible toggle connected to said valve, means for extending the toggle to shift said valve to a working stroke position, said toggle being self-locking in its fully extended condition, means other than said first mentioned means for engaging and collapsing said toggle to effect shifting of the valve from a working stroke to a return stroke position and means controlled by the movement of the press ram for automatically operating said second mentioned means when the press ram has travelled to a predetermined point of its power stroke.

9. In a hydraulic press, a press cylinder, mechanism for controlling the main working valve comprising a manually operable lever, a collapsible toggle connected between said valve and lever, said toggle being moved to and locked in an extended position when the lever is swung to the full limit of its travel in a toggle extending direction, a toggle collapsing trip member and means functioning automatically to move said trip member into toggle collapsing engagement with one of the links of the extended toggle in response to the development of a predetermined pressure in the pressing cylinder during a working stroke of the press.

10. The construction set forth in claim 9 in which the last mentioned means comprises an auxiliary cylinder connected to the pressing cylinder, a piston working in said auxiliary cylinder adapted to be moved in one direction in response to establishment of a predetermined pressure in the pressing cylinder and means carried by said piston for moving said trip member to a toggle collapsing position when said piston is moved as aforesaid in response to development of a predetermined pressure in the pressing cylinder.

11. Valve actuating mechanism comprising, in combination, a valve, a slidably mounted rack member connected to said valve, a pinion meshing with said rack member, a pinion driving shaft, means providing a lost motion drive connection between said pinion and said driving shaft, a manually operable lever, a toggle connected between the rack member and the lever so that the toggle becomes self-locking in an extended position when the lever is swung to the full limit of its travel in a toggle extending direction, such extension of the toggle serving to shift the rack member and the valve in one direction, a trip member movable into toggle collapsing engagement with one of the toggle links to effect collapse of the toggle after the latter has been extended by operation of said lever, stop means adapted to be removably interposed in the path of movement of said lever to prevent full travel thereof in said toggle extending direction, said stop means serving to arrest the lever after the toggle has been partly extended to a valve shifting position but before the toggle has reached its fully extended self-locking position.

12. Valve actuating mechanism of the character described comprising, in combination, a valve, a slidably mounted rack member connected to said valve, a pinion meshing with said rack member, a shaft on which said pinion is rotatably mounted and lost motion means for operating said pinion and rack member in response to rotation of said shaft comprising a driving element fixed to rotate with said shaft and a driven element on the pinion adapted to be engaged by said driving element, a pivotally mounted valve operating lever, a toggle connected between said lever and said rack member, said toggle being extended to operate the rack member and the valve in one direction when said lever is swung to a predetermined position and a toggle trip member movable into toggle collapsing engagement with one of the links of the extended toggle to initiate collapse of the toggle while said lever is still in its toggle extending position.

13. Valve actuating mechanism as set forth in claim 12 including a stop member adapted to be removably interposed in the path of said lever to prevent full travel of the lever in its toggle extending direction and thereby ensure collapse of the toggle and return of the valve member to its former position after the lever is released following operation thereof in a toggle extending direction to the extent permitted by said stop member.

14. In a hydraulic press, a press cylinder, mechanism for controlling the main working valve comprising a collapsible toggle connected to said valve, means for extending the toggle to shift the valve to a working stroke position, said toggle being self-locking in its fully extended condition, means other than said first mentioned means for collapsing said toggle to effect shifting of the valve from a working stroke to a return stroke position, an "inching" control mechanism for operating said valve independently of said toggle to effect a slow or "inching" travel of the valve in either a power stroke or a return stroke direction, said "inching" control mechanism having a lost motion drive connection with said valve and means for preventing said toggle assuming a fully extended self-locking position when said "inching" control mechanism is in use.

15. In a hydraulic press, a press cylinder, mechanism for controlling the main working valve comprising a collapsible toggle connected to said valve, means for extending the toggle to shift said valve to a working stroke position, said toggle being self-locking in its fully extended condition, a toggle collapsing trip member movable into toggle collapsing engagement with one of the links of the extended toggle to initiate collapse of the toggle while said lever is still in its toggle extending position, fluid pressure responsive means for operating said trip member to collapse the toggle in response to the establishment of a predetermined pressure in the pressing cylinder during a working stroke of the press, mechanical means for operating said trip member to collapse the toggle when the press ram has travelled to a predetermined point of its power stroke and means for rendering said fluid pressure responsive means inoperative when the mechanical means for operating the toggle trip member is in use.

16. Valve actuating mechanism comprising, in combination, a valve, a collapsible toggle connected to said valve, means for extending the toggle to shift said valve to one working position, said toggle being self-locking in its fully extended condition and means for collapsing said toggle to effect shifting of the valve to a different working position to that from which the valve is shifted by the extension of said toggle, said last mentioned means comprising a toggle trip member movable into toggle collapsing engagement with one of the links of the extended toggle, a cylinder and piston device for operating said trip member and means for supplying pressure fluid to said cylinder and piston device including a flow regulating valve.

WILLIAM P. MUIR.
JOHN H. MAUDE.